United States Patent
Wang et al.

(10) Patent No.: US 11,182,180 B2
(45) Date of Patent: Nov. 23, 2021

(54) PREVIEWING APPLICATION USER INTERFACE FOR MULTIPLE LOCALES

(71) Applicant: Citrix Systems, Inc., Fort Lauderdale, FL (US)

(72) Inventors: Yang Wang, Nanjing (CN); Jingxin Peng, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 56 days.

(21) Appl. No.: 16/530,150

(22) Filed: Aug. 2, 2019

(65) Prior Publication Data

US 2020/0401425 A1    Dec. 24, 2020

Related U.S. Application Data

(63) Continuation of application No. PCT/CN2019/092535, filed on Jun. 24, 2019.

(51) Int. Cl.
*G06F 9/451*     (2018.01)
*G06F 40/106*    (2020.01)

(52) U.S. Cl.
CPC .......... *G06F 9/454* (2018.02); *G06F 40/106* (2020.01)

(58) Field of Classification Search
None
See application file for complete search history.

(56) References Cited

U.S. PATENT DOCUMENTS

| | | | | |
|---|---|---|---|---|
| 5,678,039 | A * | 10/1997 | Hinks | G06F 9/454 |
| 7,627,479 | B2 * | 12/2009 | Travieso | G06F 40/205 |
| | | | | 704/277 |
| 9,262,407 | B1 * | 2/2016 | Ermann | G06F 40/106 |
| 9,934,129 | B1 * | 4/2018 | Budurean | G06F 11/3688 |
| 10,599,786 | B1 * | 3/2020 | Malcangio | G10L 15/30 |

(Continued)

FOREIGN PATENT DOCUMENTS

| | | |
|---|---|---|
| CN | 102855055 A | 1/2013 |
| CN | 103793322 A | 5/2014 |

(Continued)

OTHER PUBLICATIONS

Mar. 27, 2020 (PCT) International Search Report and Written Opinion of the International Searching Authority—App PCT/CN2019/092535.

*Primary Examiner* — Henry Orr
(74) *Attorney, Agent, or Firm* — Banner & Witcoff, Ltd.

(57) ABSTRACT

Methods and systems for previewing an application user interface (UI) for multiple locales are described herein. A first device, on which an application capable of rendering views for multiple locales, may receive selections of a first locale and a second locale from a second device via a web console running on the second device. The first device may render a plurality of UI screens including a first UI screen, corresponding to a current view of the application, for the first locale, and a second UI screen, corresponding to the current view, for the second locale. The first device may generate screenshots of the plurality of UI screens and send the generates screenshots to the second device to be displayed on the web console. A developer of the application may inspect the multi-locale UI of the application through the displayed screenshots and make any necessary adjustments if necessary.

17 Claims, 9 Drawing Sheets

(56) References Cited

U.S. PATENT DOCUMENTS

| | | | | |
|---|---|---|---|---|
| 2007/0250509 | A1* | 10/2007 | Marti | G06F 40/211 |
| 2008/0127103 | A1* | 5/2008 | Bak | G06F 9/451 |
| | | | | 717/126 |
| 2010/0011354 | A1* | 1/2010 | Gharabally | G06F 9/454 |
| | | | | 717/178 |
| 2012/0042281 | A1* | 2/2012 | Green | G06F 9/454 |
| | | | | 715/810 |
| 2012/0109869 | A1* | 5/2012 | Sahibzada | G06F 40/58 |
| | | | | 706/47 |
| 2013/0007588 | A1* | 1/2013 | Guo | G06F 11/3688 |
| | | | | 715/234 |
| 2015/0154181 | A1* | 6/2015 | Dmytryshyn | G06F 9/454 |
| | | | | 704/2 |
| 2017/0039448 | A1* | 2/2017 | Ganda | G06K 9/6202 |
| 2018/0260232 | A1* | 9/2018 | Yan | G06F 9/454 |
| 2018/0307683 | A1* | 10/2018 | Lipka | G06F 40/14 |

FOREIGN PATENT DOCUMENTS

| | | |
|---|---|---|
| CN | 103942212 A | 7/2014 |
| CN | 105573993 A | 5/2016 |

* cited by examiner

| STRING ID 501 | KEY 502 | LOCALE 503 | LOCALIZED STRING 504 | |
|---|---|---|---|---|
| 10001 | IDS_MAIN_TITLE_HELLO | en-US | Hello | ← 505A |
| | | en-GB | Hello | ← 505B |
| | | fr-FR | Bonjour | ← 505C |
| | | ko-KR | 안녕 | ← 505D |
| | | zh-CN | 你好 | ← 505E |
| 10002 | IDS_MAIN_TITLE_GOODBYE | en-US | Goodbye | ← 506A |
| | | en-GB | Goodbye | ← 506B |
| | | fr-FR | <NULL> | ← 506C |
| | | ko-KR | <NULL> | ← 506D |
| | | zh-CN | 你好 | ← 506E |
| 10003 | IDS_PARAMETER_COLOR | en-US | Color | ← 507A |
| | | en-GB | Colour | ← 507B |
| | | fr-FR | <NULL> | ← 507C |
| | | ko-KR | 색깔 | ← 507D |
| | | zh-CN | 颜色 | ← 507E |
| ... | ... | ... | ... | |

FIG. 5

PREVIEWING APPLICATION USER INTERFACE FOR MULTIPLE LOCALES

CROSS-REFERENCE TO RELATED APPLICATIONS

This Application claims priority to Chinese PCT Application No. PCT/CN2019/092535, filed Jun. 24, 2019, titled Previewing Application User Interface For Multiple Locales, which is hereby incorporated by reference in its entirety.

FIELD

Aspects described herein generally relate to user interfaces. More particularly, aspects of the present disclosure relate to localizing user interfaces for multiple locales.

BACKGROUND

The ability to market and deploy software products in multiple global markets is a key to success in modern information technology industry. For example, a company may wish to launch a new mobile application in several different countries in North America, South America, Europe, Asia, and other regions simultaneously. In order to develop software for multiple regions, the application needs to be adapted or localized according to individual languages, units of measurement, etc. Specifically, various user interface (UI) elements and assets, such as text and icons, need to be translated or converted to a target locale.

However, the task of translating the text used in an application is typically performed by translators who are linguistically minded but may not be well-versed in software development. On the other hand, the software developers who write code for the application are engineers who are not familiar with all the target languages that the application is being translated to. To make this process more complicated, the translation work may not even begin until all the text assets that are to be used in the application are finalized and the app development is well underway. This means that while the developers are designing the graphical user interface (GUI) for the application, they are unable to visually inspect how the UI will eventually look like in every target locale, and by the time the translated text is made available, a significant amount of time will have already passed before any errors or discrepancies can be spotted and fixed. Therefore, the app localization has traditionally been done through numerous cycles of prototyping, translation, quality assurance, and revision. This can be time-consuming, costly, and inefficient.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

The present specification is directed towards devices, systems, and methods for generating previews for an application UI localized for multiple locales.

According to an aspect of an example embodiment, a first device may receive an indication of a first locale and a second locale from a second device. The first device may render a plurality of user interface (UI) screens including (i) a first UI screen, corresponding to a current view of an application running on the first device, for the first locale, and (ii) a second UI screen, corresponding to the current view of the application, for the second locale. The first device may generate a plurality of screenshots including a first screenshot and a second screenshot. The first screenshot may correspond to the first UI screen and the second screenshot may correspond to the second UI screen. The first device may send the plurality of screenshots to the second device.

The second device may include a web console, and the indication may be received by the second device from a user via the web console.

The first device may send, to the second device, a command to cause the plurality of screenshots to be displayed.

Rendering the plurality of UI screens may include, after determining that a translated string corresponding to a key is missing from a resource corresponding to the first locale, generating a pseudo-translated string for the key, and rendering the first UI screen based on the pseudo-translated string.

The resource corresponding to the first locale may be a string table that includes a plurality of entries. Each entry of the plurality of entries may include a key, a string identifier, and/or a localized string corresponding to the first locale.

Rendering the plurality of UI screens may include switching a current locale of the application from a default locale to the first locale; rendering the first UI screen, corresponding to the current view of the application, for the first locale; storing the rendered first UI screen; switching the current locale of the application from the first locale to the second locale; rendering the second UI screen, corresponding to the current view of the application, for the second locale; storing the rendered second UI screen; and switching the current locale of the application from the second locale to the default locale.

The first device may include a web server, and sending the plurality of screenshots may include sending, by the web server and to the second device, a webpage that includes the plurality of screenshots.

Sending the plurality of screenshots to the second device may include generating a composite UI screen that includes the first screenshot and the second screenshot; and sending the composite UI screen to the second device.

Rendering the plurality of UI screens may include rendering the plurality of UI screens without restarting the application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 5 is a table showing example localization resources.

DETAILED DESCRIPTION

Figure 1:
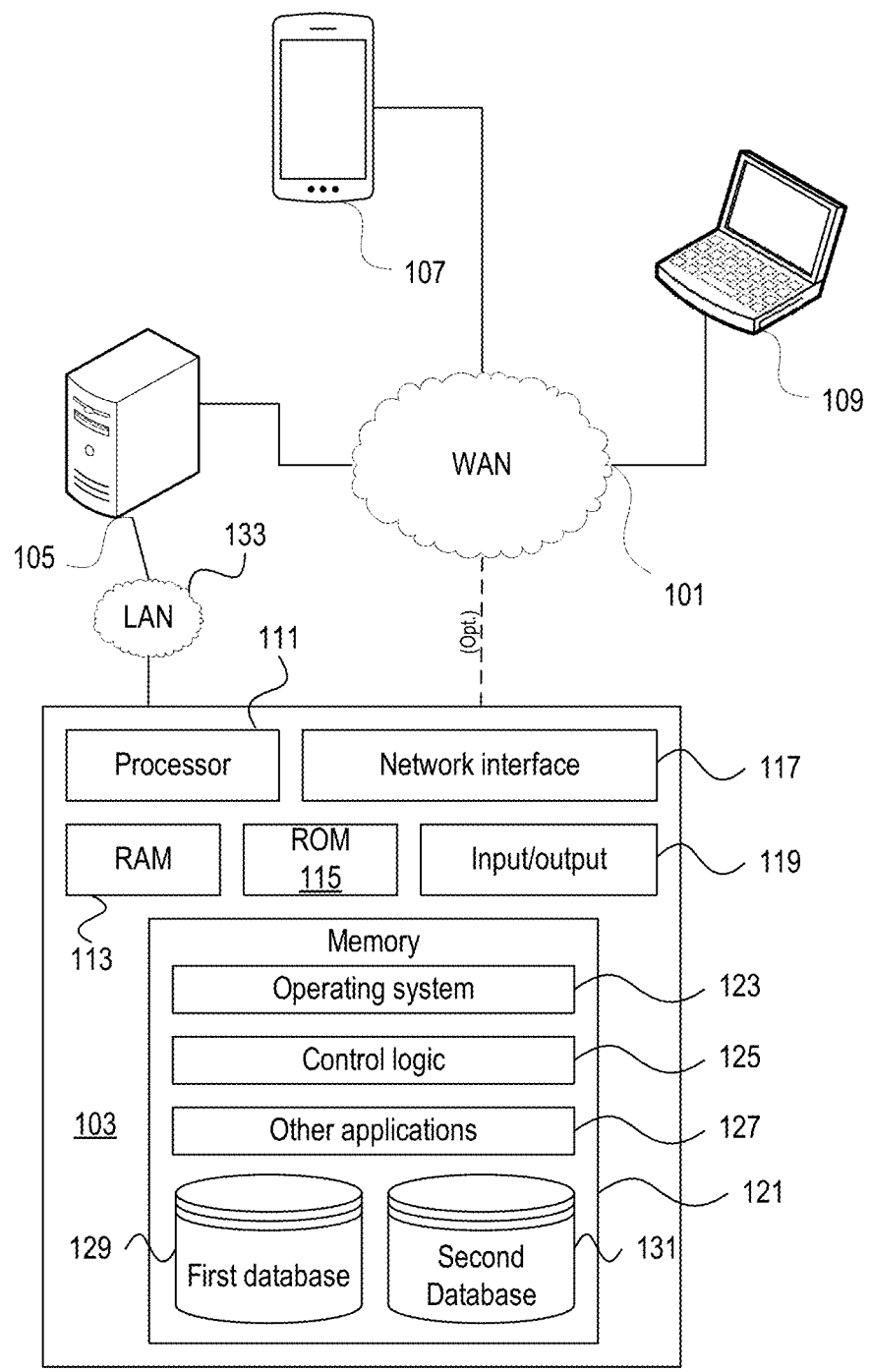
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are related to a method, a system, and a computer-readable medium for providing UI previews for multiple locales. In particular, a user may indicate, via a web console, one or more desired locales for a particular software application, and the web console may simultaneously display the screenshots of a current view of the application corresponding to the indicated locales. These multi-locale screenshots may be rendered and displayed substantially in real time as the user manipulates the application without the need of restarting the application or the device. As a result, the developers of the application may have a better idea, even before the application is fully developed, about what its user interface may eventually look like for different locales and be able to make necessary adjustments. Thus, the application development and localization process may become more efficient.

As used throughout this disclosure, the term "localization" broadly refers to a process of adapting software and/or hardware, which was originally developed for sale in one region or country, for deployment in another region or country. Thus, localization often involves translation of assets, such as text and graphics, from one language to another language. For example, a software product originally developed for use in an English-speaking region may be localized to be marketed and sold in a different region where Spanish is a predominantly spoken language. As another example, video games originally developed in the English language for the U.S. market are often additionally localized into French, Italian, German, and Spanish (colloquially referred to as "FIGS") for the European market.

The term "locale" refers to one or more parameters that define the user's language and region. A locale may be identified using a language code and/or a country/region code. A standard notation such as the Internet Engineering Task Force (IETF) language tag may be composed of one or more subtags separated by hyphens (-). For example, "en-US" may indicate English as spoken in the United States while "en-GB" may indicate English as spoken in the United Kingdom. Other examples may include "fr" for French, "de" for German, "es-MX" for Spanish (Mexico), and "zh-CN" for Chinese (People's Republic of China). For the sake of simplicity, the term "locale" may be used, depending on the context, interchangeably with "language," "location," "region," and/or "country" throughout this disclosure.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. Local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control, and administration of databases and control software for performing one or more illustrative aspects describe herein. Data server 103 may be connected to web server 105, through which users interact with and obtain data as requested. Alternatively, data server 103 may act as a web server itself and be directly connected to WAN 101. Data server 103 may be connected to web server 105 through local area network 133, wide area network 101 (e.g., the Internet), via direct or indirect connection, or via some other network. Users may interact with data server 103 using remote computers 107, 109, e.g., using a web browser to connect to data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single physical server.

Each component 103, 105, 107, 109 may be any type of known computer, server, or data processing device. Data server 103 may include, for example, processor 111 controlling overall operation of data server 103. Data server 103 may further include random access memory (RAM) 113, read-only memory (ROM) 115, network interface 117, input/output (I/O) interfaces 119 (e.g., keyboard, mouse, display, printer, etc.), and memory 121. I/O interfaces 119 may include a variety of interface units and drives for reading, writing, displaying, and/or printing data or files. Memory 121 may further store operating system software 123 for controlling overall operation of data processing device 103, control logic 125 for instructing data server 103 to perform aspects described herein, and other application software 127 providing secondary, support, and/or other functionality which may be used in conjunction with aspects described herein. Control logic 125 may also be referred to herein as data server software 125. Functionality of data server software 125 may include operations or decisions made automatically (e.g., without human user intervention) based on rules coded into control logic 125, made manually by a user providing input into the system, and/or a combination of automatic processing based on user input (e.g., queries, data updates, etc.).

Memory 121 may also store data used in performance of one or more aspects described herein, and may include first database 129 and/or second database 131. In some embodiments, first database 129 may include second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or computer-readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Hypertext Markup Language (HTML) or Extensible Markup Language (XML). The computer executable instructions may be stored on a computer-readable medium such as a nonvolatile storage device. Any suitable computer-readable storage media may be utilized, including hard disks, compact disc read-only memories (CD-ROMs), optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits (ICs), field-programmable gate arrays (FPGAs), application-specific integrated circuits (ASICs), virtual machines, and the like. Particular data structures may be used to more effectively implement one or more aspects described herein, and such data structures are contemplated within the scope of computer-executable instructions and computer-usable data described herein.

Figure 2:
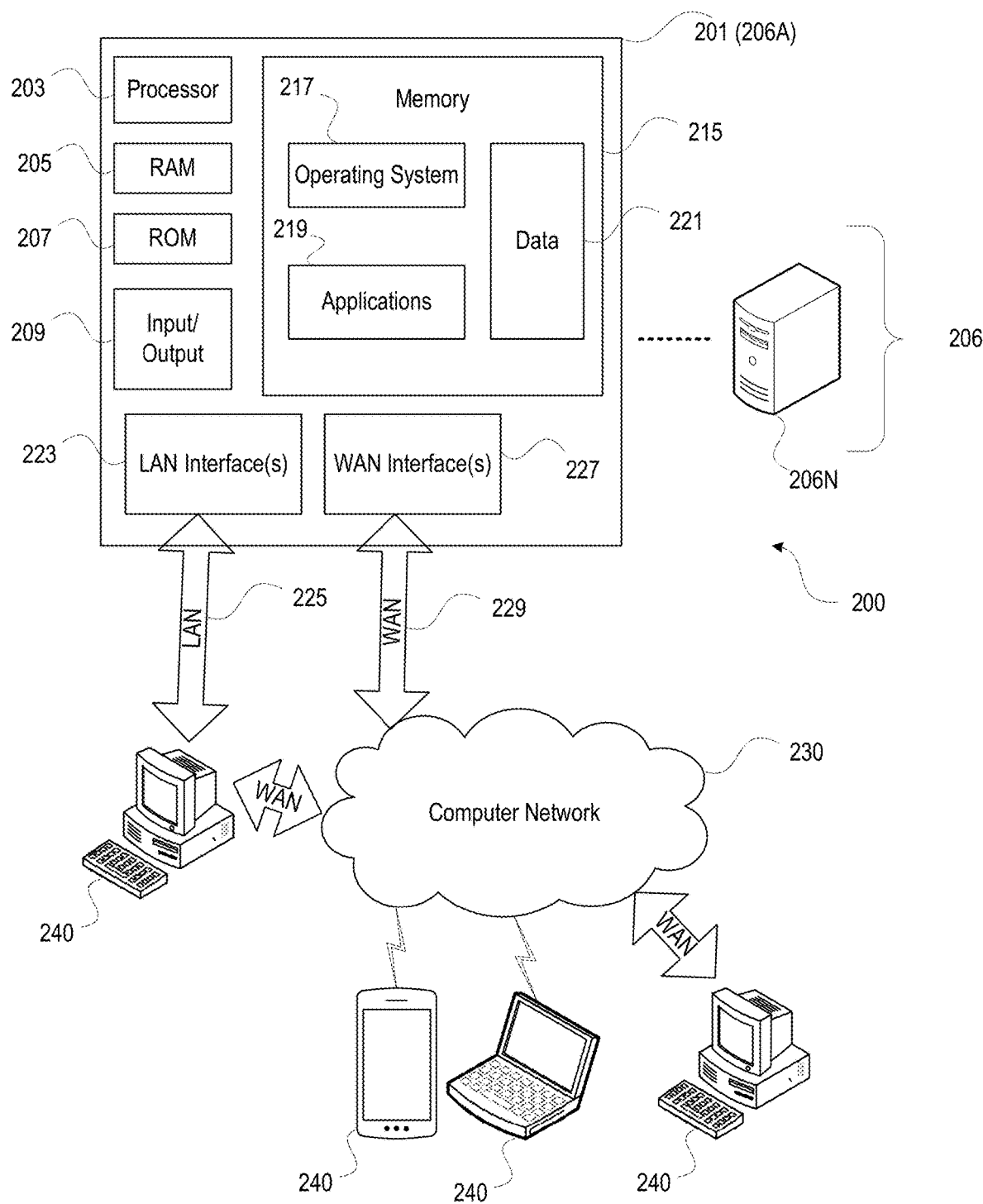
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including computing device 201 in an illustrative computing environment 200 that may be used according to one or more illustrative aspects described herein. Computing device 201 may be used as server 206A in a single-server or multi-server desktop virtualization system (e.g., a remote-access or cloud system) and can be configured to provide virtual machines for client access devices. Computing device 201 may have processor 203 for controlling overall operation of device 201 and its associated components, including RAM 205, ROM 207, input/output (I/O) interfaces 209, and memory 215.

I/O interfaces 209 may include a mouse, a keyboard, a keypad, a touch screen, a scanner, a sensor, an optical reader, a camera, a microphone, a stylus, and/or other input device(s) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special-purpose computing device in order to perform various functions as described herein. For example, memory 215 may store software used by computing device 201, such as operating system 217, application programs 219, and other associated data 221 (e.g., a database).

Computing device 201 may operate in a networked environment supporting connections to one or more remote computers, such as terminals 240 (also referred to as client devices and/or client machines). Terminals 240 may be personal computers (PCs), mobile devices, smartphones, laptop computers, tablets, wearable computing devices, and/or servers that include some or all of the elements described above with respect to computing device 103 or 201. The network connections depicted in FIG. 2 may include local area network (LAN) 225 and wide area network (WAN) 229, but may also include other networks. When used in a LAN networking environment, computing device 201 may be connected to LAN 225 through a LAN interface or adapter 223 (e.g., a network interface controller). When used in a WAN networking environment, computing device 201 may include a modem or other wide area network interface 227 for establishing communications over WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, a speaker, and antennas (not shown).

Aspects described herein may also be operational with numerous other general-purpose or special-purpose computing system environments or configurations. Examples of other computing systems, environments, and/or configurations that may be suitable for use with aspects described herein may include, but are not limited to, PCs, server computers, hand-held or laptop devices, multiprocessor systems, set-top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206A-206N (generally referred to herein as "server(s) 206"). In one embodiment, computing environment 200 may include a network appliance installed between server(s) 206 and client machine(s) 240. The network appliance may manage client/server connections, and in some cases can load balance client connections amongst a plurality of backend servers 206.

Client machine(s) 240 may in some embodiments be referred to as a single client machine 240 or a single group of client machines 240, while server(s) 206 may be referred to as a single server 206 or a single group of servers 206. In some embodiments a single client machine 240 may communicate with more than one server 206, while in other embodiments, a single server 206 may communicate with more than one client machine 240. In yet other embodiments, a single client machine 240 may communicate with a single server 206.

Client machine 240 may, in some embodiments, be referred to as any one of the following non-exhaustive terms: a client machine, a client, a client computer, a client device, a client access device, a client computing device, a local machine, a remote machine, a client node, an endpoint, an endpoint node, a terminal, a user terminal, a user device, etc. Server 206, in some embodiments, may be referred to as any one of the following non-exhaustive terms: a server, a local machine, a remote machine, a server farm, a host, a host device, a host computing device, etc.

In some embodiments, client machine 240 may be a virtual machine. A virtual machine may refer to a software emulated instance of a physical computer. The virtual machine may be managed by a Type 1 or Type 2 hypervisor, for example, a hypervisor developed by Citrix Systems®, IBM®, VMware®, or any other hypervisor. In some aspects, the hypervisor may execute on server 206 or on client 240.

In some embodiments, client device 240 may display application output generated by an application remotely executing on server 206 or other remotely located machine. In these embodiments, client device 240 may execute a virtual machine receiver program or application to display the output in an application window, a browser, or other output window. In one example, the remotely executed application is a desktop, while in other examples, the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, may use a remote presentation protocol or other program to send data to a thin-client or remote-display application executing on the client to present display output generated by an application executing on server 206. The thin-client or remote-display protocol may be any one of the following non-exhaustive list of protocols: the Independent Computing Architecture (ICA) protocol developed by Citrix Systems, Inc. of Ft. Lauderdale, Fla.; or the Remote Desktop Protocol (RDP) developed by the Microsoft Corporation of Redmond, Wash.

A remote computing environment may include more than one server 206A-206N such that servers 206A-206N are logically grouped together into server farm 206, for example, in a cloud computing environment. Server farm 206 may include servers 206 that are geographically dispersed while logically grouped together, or servers 206 that are located proximate to each other (e.g., housed within the same physical facility) while logically grouped together. Geographically dispersed servers 206A-206N within server farm 206 may, in some embodiments, communicate using a WAN, a MAN, or a LAN, where different geographic regions may be characterized as: different continents, different regions of a continent, different countries, different states, different cities, different campuses, different buildings, different rooms, or any combination of the preceding geographical locations. In some embodiments, server farm 206 may be administered as a single entity, while in other embodiments, server farm 206 may include multiple server farms.

In some embodiments, a server farm may include servers 206 that execute a substantially similar type of operating system platform (e.g., Windows®, macOS®, Unix®, Linux®, iOS®, Android®, Symbian®, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) virtual private network (VPN) server, a firewall, a web server, a master application server, a server executing an active directory, or a server executing an application acceleration program that provides firewall functionality, application functionality, or load balancing functionality. Other server types may also be used.

Some embodiments may include first server 206A that receives requests from client machine 240, forwards the request to second server 206B (not shown), and responds to the request generated by client machine 240 with a response from second server 206B (not shown). First server 206A may acquire an enumeration of applications available to client machine 240 as well as address information associated with application server 206 hosting an application identified within the enumeration of applications. First server 206A may then present a response to the client's request using a web interface, and communicate directly with client 240 to provide client 240 with access to an identified application. One or more clients 240 and/or one or more servers 206 may transmit data over network 230, e.g., network 101.

Figure 3:
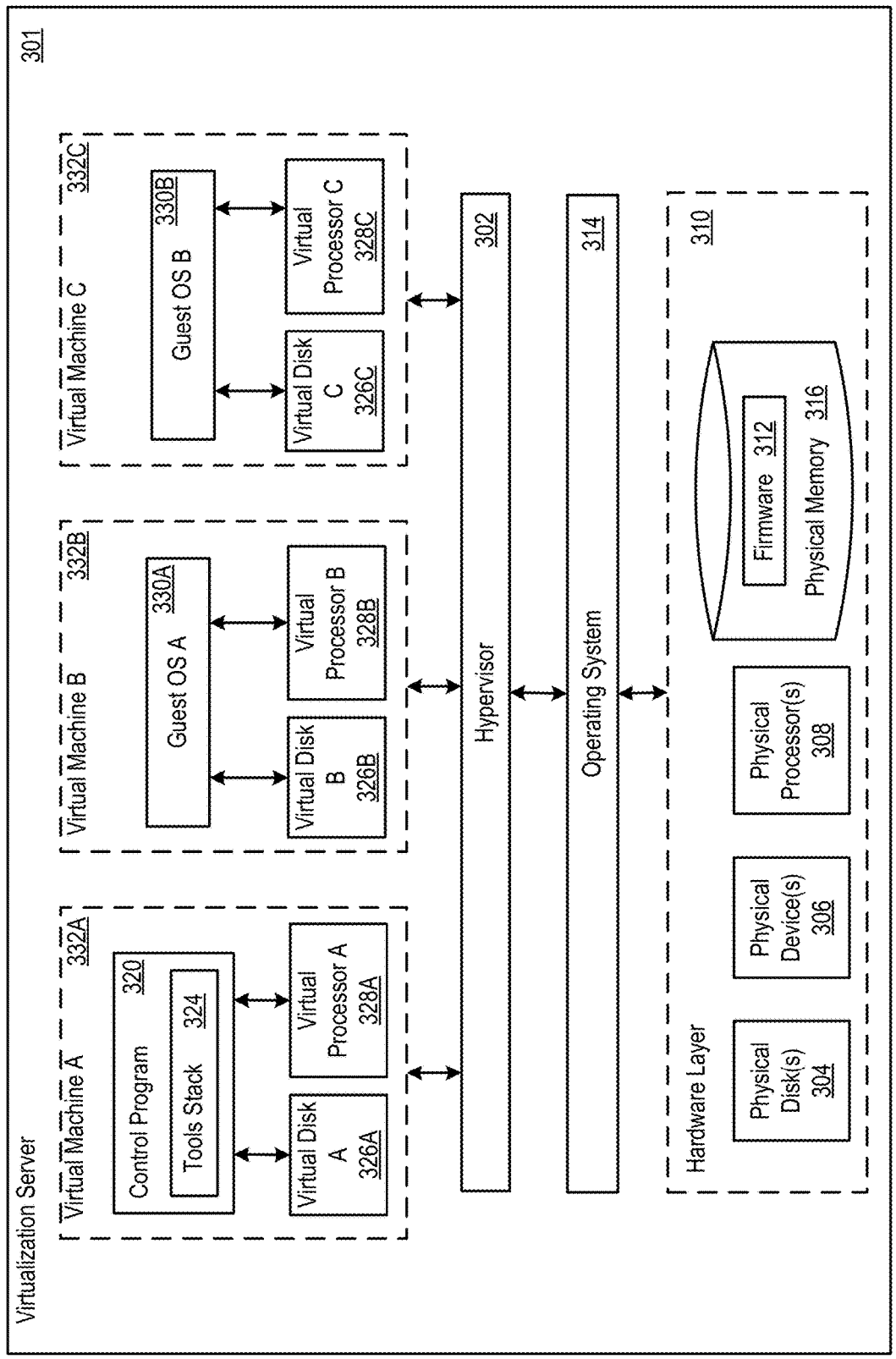
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be a single-server or multi-server system, or a cloud system, including at least one virtualization server 301 configured to provide virtual desktops and/or virtual applications to one or more client access devices 240. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Computer device 301 may be configured as a virtualization server in a virtualization environment, for example, a single-server, multi-server, or cloud computing environment. Virtualization server 301 illustrated in FIG. 3 may be deployed as and/or implemented by one or more embodiments of server 206 illustrated in FIG. 2 or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 3 illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, virtualization server 301 may execute hypervisor 302 that creates a virtual machine platform on which guest operating systems 330 may execute. In these embodiments, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by virtualization server 301 (e.g., any hardware resource available within hardware layer 310). In other embodiments, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 3, virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 3 illustrates an embodiment where virtualization server 301 hosts three virtual machines 332, in other embodiments virtualization server 301 may host any number of virtual machines 332. Hypervisor 302, in some embodiments, may provide each virtual machine 332 with a unique virtual view of the physical hardware, including memory 316, processor 308, and other system resources 304, 306 available to that virtual machine 332. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326, in some embodiments, may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. Thus, in these embodiments, particular virtual disk 326 included in each virtual machine 332 may be unique when compared with other virtual disks 326.

Virtual processor 328 may be a virtualized view of one or more physical processors 308 of virtualization server 301. In some embodiments, the virtualized view of physical processors 308 may be generated, provided, and managed by hypervisor 302. In some embodiments, virtual processor 328 may have substantially all of the same characteristics of at least one physical processor 308. In other embodiments, virtual processor 308 may provide a modified view of physical processors 308 such that at least some of the characteristics of virtual processor 328 are different from the characteristics of the corresponding physical processor 308.

Previewing User Interfaces for Multiple Locales

Figure 4:
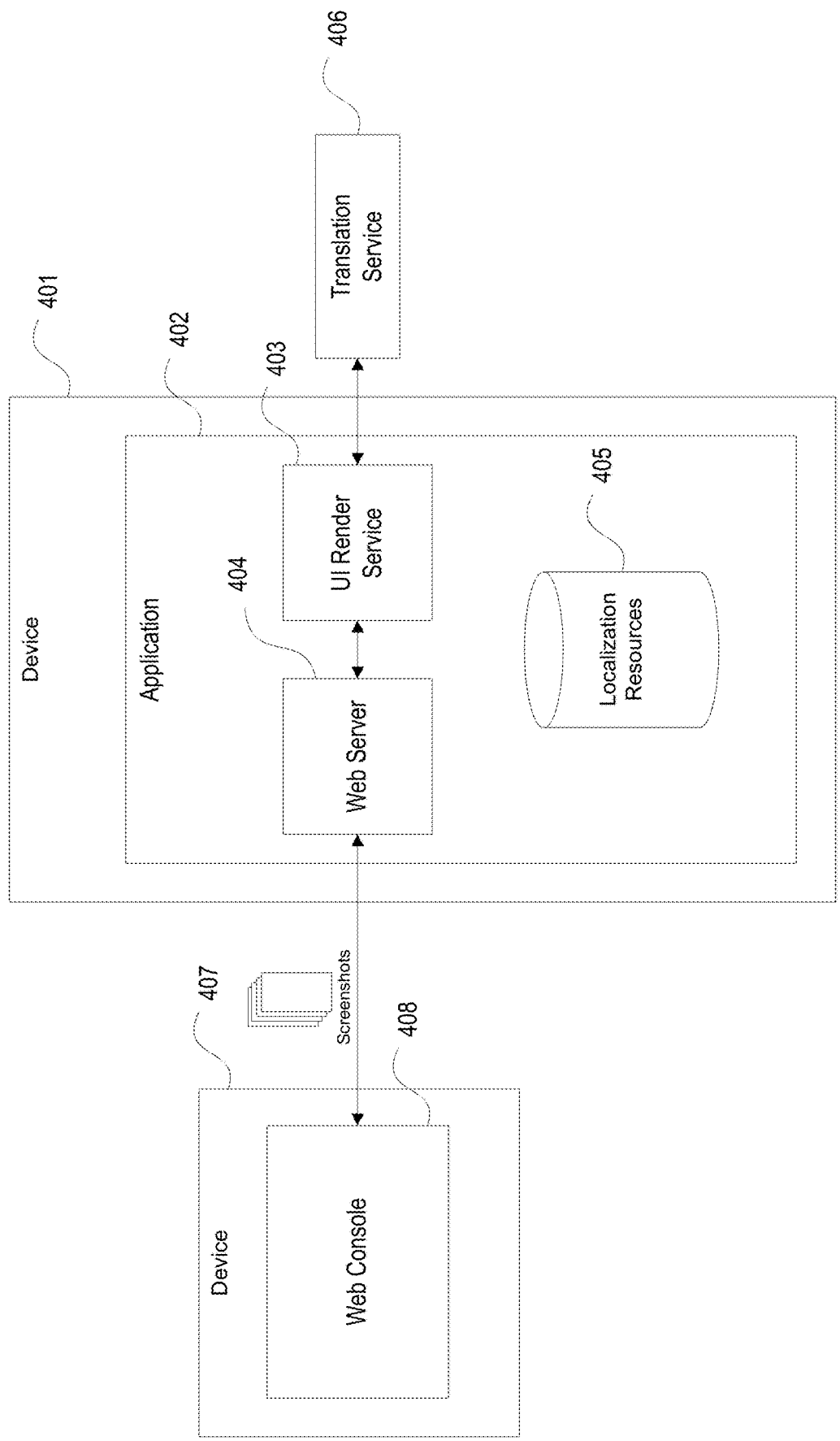
FIG. 4 is a block diagram showing an example system for generating UI previews for multiple locales.

FIG. 4 is a block diagram showing an example system for generating UI previews for multiple locales. In this example embodiment, device 401 may execute application 402. Device 401 may be any of the devices previously discussed with reference to FIGS. 1, 2, and 3, such as devices 105, 107, 109 and terminals 240. In particular, device 401 may be a mobile device such as a smartphone or a tablet. Device 401 may have a number of hardware and/or software components, such as a processor, a display, memory, storage, input/output interfaces, etc., but they are omitted from FIG. 4 to avoid duplicative description. In some embodiments, device 401 may be a virtual device or an emulator. Application 402 may be a desktop application, a mobile application, or the like that is running on device 401. In particular, application 402 may be an application that is still in development and not yet available for sale or deployment. Alternatively, application 402 may be a fully developed product but undergoing revision for an upgrade or a bug patch.

Application 402 may comprise, among other components, UI render service 403, web server 404, and localization resources 405. UI render service 403 (or more simply, "UI renderer") be a software module or service embedded in application 402 and is responsible for generating a display image for a given view of the application. For example, for a user login view of the application, UI render service 403 may put together various graphical user interface (GUI) elements (e.g., icons, text boxes, graphical elements, buttons, etc.) and generate a screen according to the software and hardware specification (e.g., memory capacity, screen resolution, color palette, user input interface, etc.) of device 401. Specifically, UI render service 403 may generate a UI screen according to a current locale setting of application 402 and/or device 401. For example, if the current locale of application 402 is set to "de," then UI render service 403 would have the UI screen image rendered in German.

UI render service 403 may use localization resources 405 when rendering a particular UI screen corresponding to a target locale. Localization resources 405 may be a collection of data stored in main memory (e.g., random access memory (RAM)) and/or storage (e.g., hard disk drive). It is often considered bad practice to "hard-code" localization resources into source code of an application because doing so would typically increase the cost and complexity of maintaining and updating code and/or localization resources. Thus, it is common practice in the industry to separate out all the text assets from the source code and into one or more resource files as part of an application library. Specifically, localization resources 405 may be stored as one or more of a string table, a database, a text file, a comma-separated values (CSV) file, an Extensible Markup Language (XML) file, a JavaScript Object Notation (JSON) file, etc. Localization resources 405 may include one or more entries having fields of string identifiers (IDs), keys, locales, and/or localized strings (also referred to as "translated strings").

Each locale within the localization resources 405 may have varying degrees of completeness in terms of the number of strings already translated. For example, localization resources 405 for a given application at a certain time during the development process may have 100% of string resources for "en-US" (English—U.S.) finalized and ready, only 87% of corresponding translated strings for "es-MX" (Spanish—Mexico), 24% of corresponding translated strings for "jp" (Japanese), and 0% for "he" (Hebrew). In order to temporarily fill these gaps, UI render service 403 may use translation service 406 to obtain pseudo-translation. Pseudo-translation broadly refers to any translation work that is performed by a non-human entity. For example, pseudo-translation may be accomplished by artificial intelligence (AI)-assisted machine translation. Pseudo-translation may have varying degrees of quality and accuracy. For example, pseudo-translated text may simply be a gibberish placeholder text (e.g., Lorem ipsum) or it may rival the quality and accuracy of human-translated work. In some embodiments, translation service 406 may provide human translation or human-assisted translation of text to UI render service 403 although this type of service is typically costlier and more time-consuming than machine translation. UI render service 403 may store translated text or pseudo-translated text received from translation service 406 in temporary storage (e.g., cache, RAM, etc.) or permanent storage (e.g., hard disk drive).

UI render service 403 may be capable of generating multiple UI screens respectively corresponding to multiple locales. For example, application 402 may cycle through two or more locale settings and generate a new UI screen image each time. This will be described below in more detail. UI render service 403 may generate screenshots of these different UI screens and send them to device 407 via web server 404. Although web server 404 is depicted in FIG. 4 as being part of application 402, web server 404 may alternatively be located outside application 402 and maybe even outside device 401. For example, web server 404 may be a separate application or service running an operating system on device 401. Device 407 may be any of the devices previously discussed with reference to FIGS. 1, 2, and 3, such as devices 105, 107, 109 and terminals 240. In particular, device 407 may be a desktop personal computer (PC) or workstation suitable for application development. Device 407 may comprise web console 408 that receives the screenshots from web server 404 and displays them for the user to review. Web console 408 may run on a web browser. Web console 408 may also receive various inputs from the user, including target locales to render the UI screen images in, and send these inputs to web server 404. Although FIG. 4 depicts device 401 and device 407 as communicating via web server 404 and web console 408, the communication between device 401 and device 407 is not limited to web communication (e.g., HyperText Transfer Protocol (HTTP)). For example, device 401 and device 407 may alternatively communicate via other communication protocols such as File Transfer Protocol (FTP).

FIG. 5 is a table showing example localization resources. Specifically, table 500 may be represented as one or more of a string table, a database, a text file, a CSV file, an XML file, a JSON file. For example, table 500 may be stored as five separate XML files, one for each of the file locales (e.g., en-US, en-GB, fr-FR, ko-KR, zh-CN). In another example, table 500 may be stored as a single CSV file. Maintaining separate files for different locales may be advantageous in situations where multiple human translators are updating the files at the same time or at their own pace. Each entry in table 500 may have one or more fields corresponding to ID 501, key 502, locale 503, and/or localized string 504. String ID 501 may uniquely identify an entry in table 500. String ID 501 may comprise a predetermined number of alphanumeric digits or letters. Similar to string ID 501, key 502 may also uniquely identify an entry in table 500 within a given namespace. However, key 502 may be more human-readable than string ID 501 because key 502 is often descriptive of where the corresponding string is to be used within the UI screen. For example, "IDS_MAIN_TITLE_HELLO" may indicate to a human user that the particular string is associated with the main title and contains a greeting. In another example, "IDS_PARAMETER_COLOR" may indicate that the corresponding string will be used as a name of a parameter and is related to color. Depending on the design of table 500, each entry in table 500 may have string ID 501 only, key 502 only, or both ID 501 and key 502.

For each string ID 501, key 502, or ID 501/key 502 pair, one or more localized strings 504 may be included in table 500, one localized string 504 for each locale 503. For example, according to example table 500, an entry corresponding to string ID 501 of "10001" and key 502 of "IDS_MAIN_TITLE_HELLO" may have five subentries 505A, 505B, 505C, 505D, 505E, each corresponding to five locales "en-US," "en-GB," "fr-FR," "ko-KR," and "zh-CN." Subentries 505A, 505B, 505C, 505D, 505E may each include localized strings 504 respectively corresponding to those five locales. Subentries 505A, 505B, 505C, 505D, 505E may be separately stored across five different files or stored in one consolidated file.

Depending on the level of progress of the development process for the application, some entries in table 500 may include empty or null strings for localized string 504. For example, table 500 indicates that subentries 506C and 506D corresponding to locales "fr-FR" and "ko-KR," respectively, and corresponding to string ID 501 of "10002" and key 502 of "IDS_MAIN_TITLE_GOODBYE," are empty at the moment. Similarly, subentry 507C corresponding to string ID 501 of "10003," key 502 of "IDS_PARAMETER_COLOR," and locale 503 of "fr-FR" is empty. These empty or null strings may be supplemented by pseudo-translation.

Figure 6:
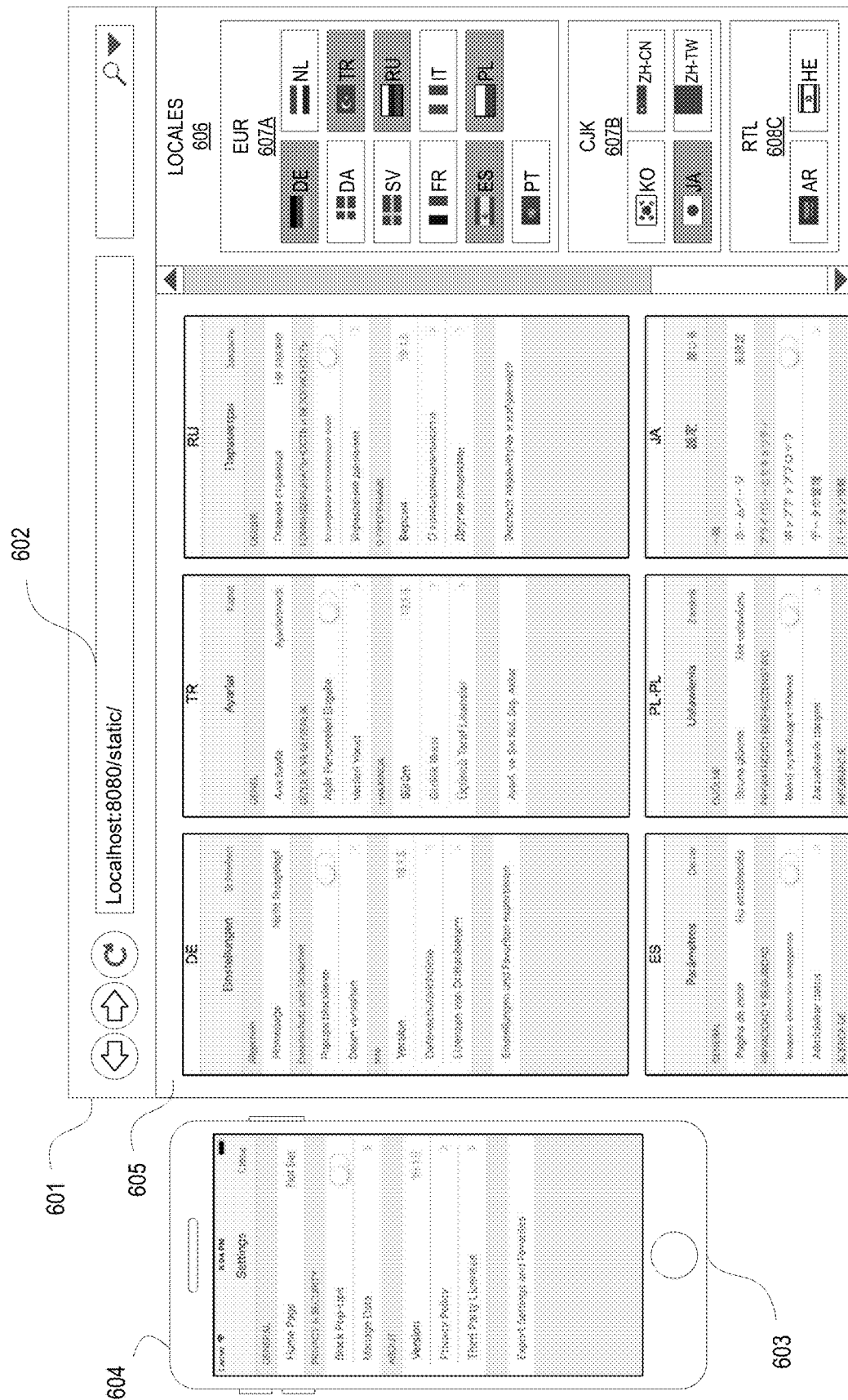
FIG. 6 shows an example web console that is capable of displaying UI screens corresponding to multiple locales simultaneously.

FIG. 6 shows an example web console that is capable of displaying UI screens corresponding to multiple locales simultaneously. Web browser 601 may run on a device (e.g., desktop PC, workstation, etc.) and may be connected to a web server represented by a Universal Resource Identifier (URI) 602. Specifically, URI 602 may point to device 603 that is executing application 604. Device 603 may be separate from the device on which web browser 601, or device 603 may be a virtual machine (e.g., app emulator) that is running on the same device as web browser 601. Accordingly, URI 602 in this particular example embodiment is pointing to a local host with the port number 8080, but URI 602 may be any other Internet Protocol (IP) address or domain name that is associated with a separate device.

A web server located inside device 603 and/or application 604 may serve web console 605 to web browser 601. Web console 605 may be a single-page web application, through which a user (e.g., app developer) may provide various inputs and access displayed information. For example, the user may select one or more locales from locale list 606 in order to obtain previews of UI screens that correspond to those selected locales. Locale list 606 may be further subdivided into categories 607A, 607B, 607C, and locales available for selection may be grouped together under respective categories 607A, 607B, 607C. The user may select one or more locales by clicking or tapping on corresponding UI elements (e.g., buttons, text, icons, etc.). A selected UI element may be indicated by a highlight, a color change, a 3D effect, etc. The user may also operate device 603 and application 604 to navigate to a particular view that he wishes to preview. When the user makes a selection of the locales, or when the user presses a "render" button (not shown) after making the selection, web console 605 may send information about the selection to application 604. Application 604 may render UI screens corresponding to the selected locales, generate screenshots of the UI screens and send the screenshots back to web console 605, which then display those screenshots. In FIG. 6, the user has selected German ("de"), Turkish ("tr"), Russian ("ru"), Spanish ("es"), Polish ("pl"), and Japanese ("ja") from locale list 606, and shortly thereafter screenshots of the current view ("Settings") of application 604, rendered in the selected locales, are simultaneously displayed on a single webpage via web console 605. Subsequently, the user is able to review what the current view of application 604 would look like in German, Turkish, Russian, Spanish, Polish, and Japanese via web console 605 substantially in real time. When rendering the UI screens in different locales, application 604 may optionally use pseudo-translation for any missing entry in the corresponding localization resource (e.g., string table). Subsequently, the user may navigate to a different view (e.g., "home screen") of application 604 or to a different application altogether on device 603. Device 603 may automatically render the new view for the user-selected locales and send the generated screenshots to web console 605, which then updates itself with the newly received screenshots. When the user updates the selection of locales on locale list 606, web console 605 may again refresh its screenshots by sending information about the selection to device 603 and receiving newly rendered screenshots.

Figure 7:
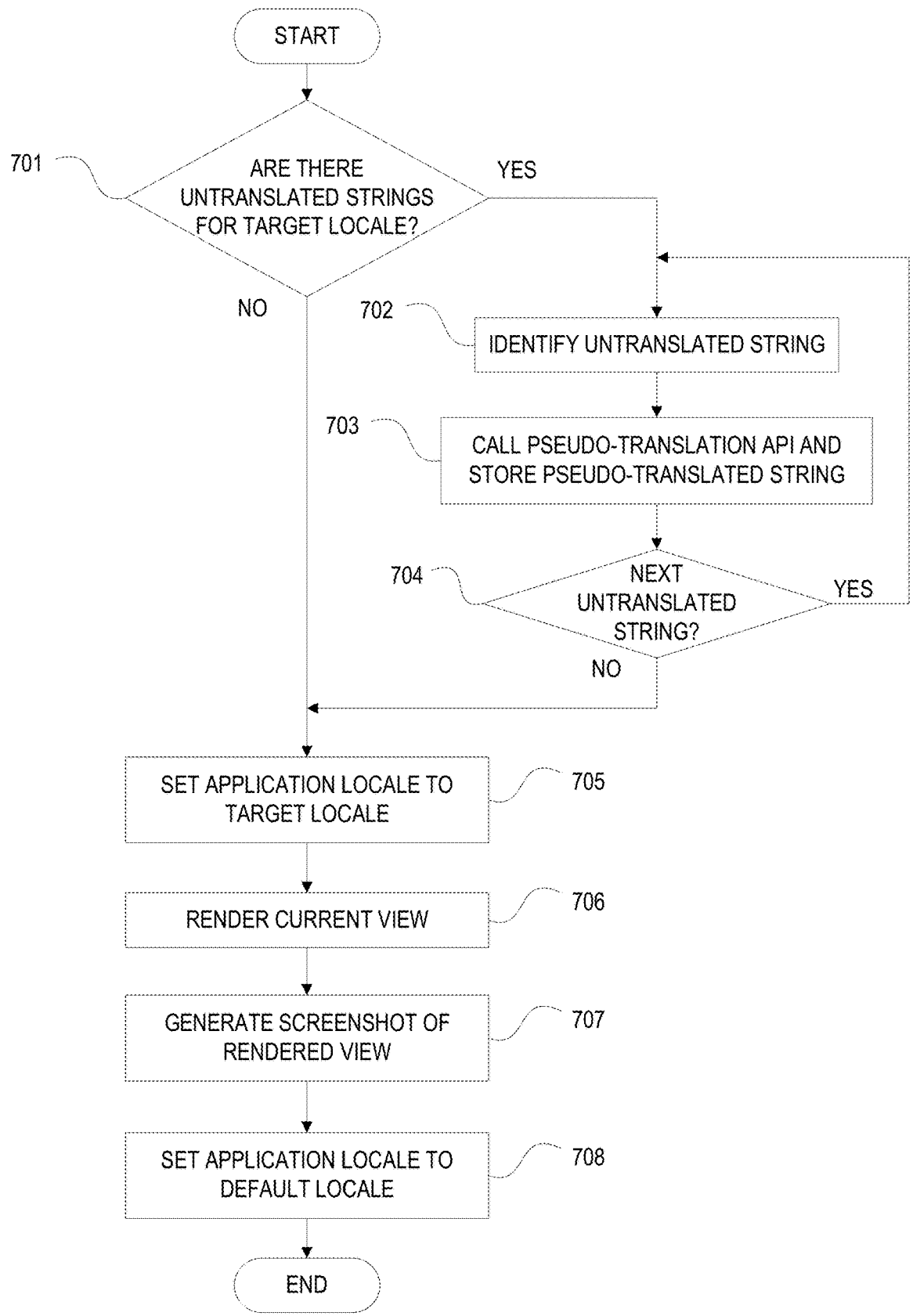
FIG. 7 is a flowchart for an example method of rendering a current view of an application according to a target locale.
Figure 8:
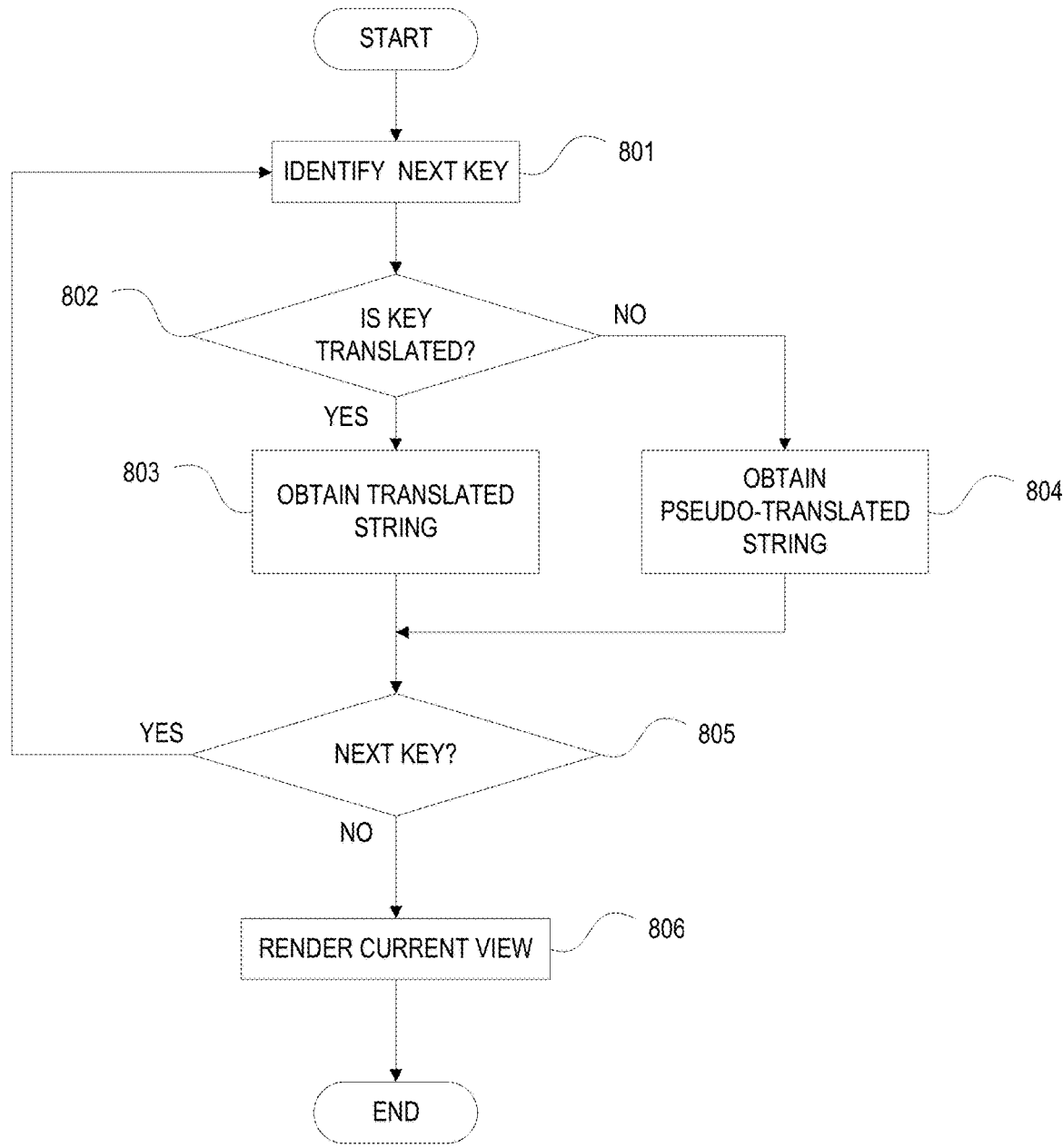
FIG. 8 is a flowchart for an example method of rendering a current view.
Figure 9:
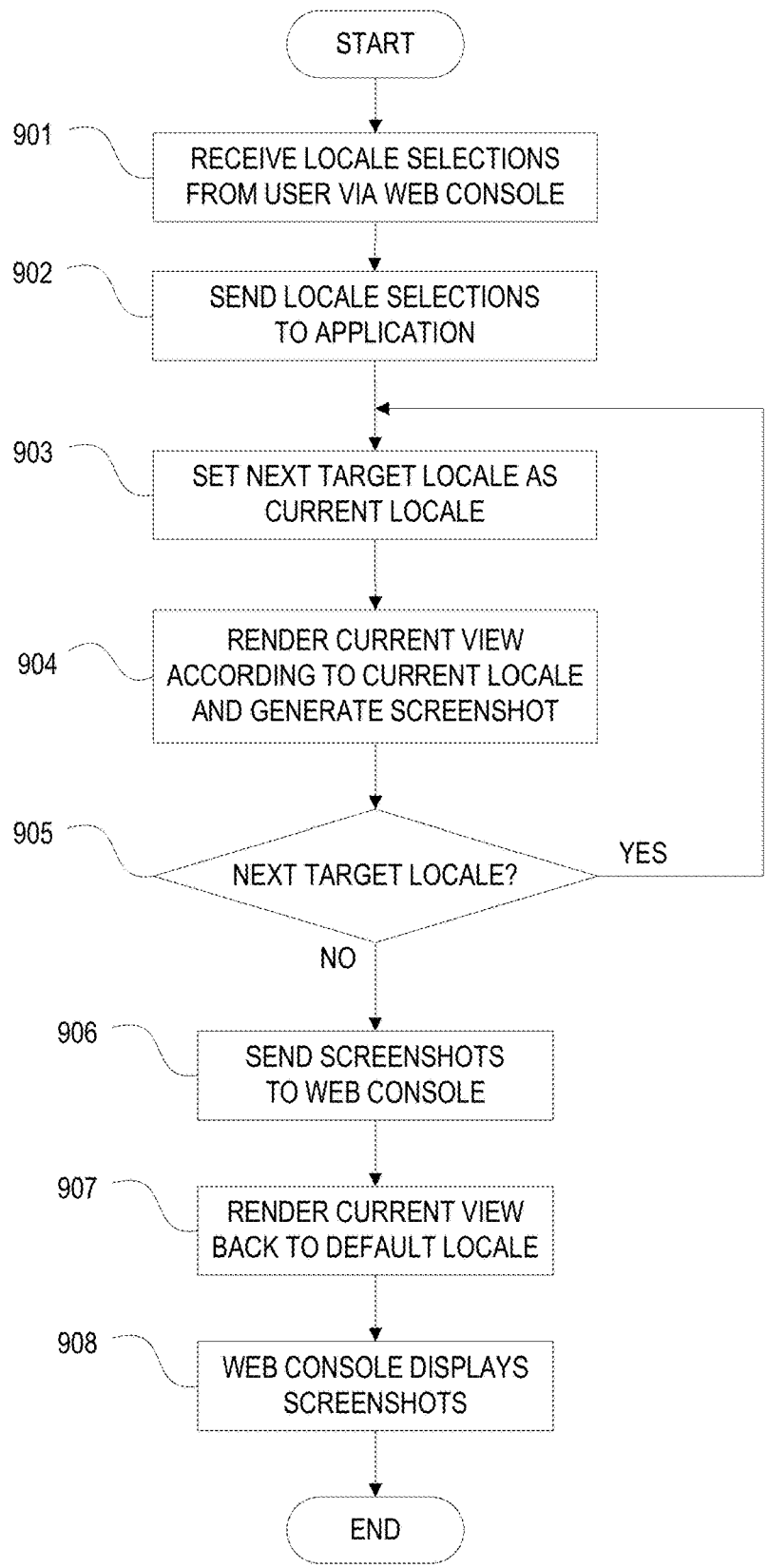
FIG. 9 is a flowchart for an example method of providing UI previews for multiple locales selected by a user.

Having disclosed some basic system components and concepts, FIGS. 7-9 illustrate methods that may be performed to implement various features described herein. Any of the steps disclosed herein may be performed by any of the devices or components that were described above, including but not limited to device 401, device 407, application 402, and web console 408. The steps outlined herein are exemplary and can be implemented in any combination thereof, including combinations that exclude, add, or modify certain steps.

FIG. 7 is a flowchart for an example method of rendering a current view of an application according to a target locale.

At step 701, an application may determine whether there are any untranslated strings in the localization resources for a target locale. A target locale may be selected by a user via a web console. For example, a default locale for the application may be "en-US" (English-United States) while the user has chosen "ru" (Russian) as one of the target locales. The default locale may be the locale that the application was originally developed for and thus may have the most complete set of string resources. The application may compare the resource file (e.g., string table) for the target locale (e.g., "ru") against the resource file for the default locale (e.g., "en-US") in order to determine if there are any missing (e.g., untranslated) strings in the resource file for the target locale. For example, the application may compare the number of keys present in each of the resource files. If the resource file for the default locale contains 6,510 keys but the resource file for the target locale contains only 4,200 keys, then it can be determined that the target locale is missing about 2,310 keys and corresponding strings.

If there are no untranslated strings for the target locale (701—NO), then the method may proceed to step 705. Otherwise (701—YES), at step 702, the application may identify the next untranslated string among the untranslated strings. At step 703, the application may call an application programming interface (API) for pseudo-translation and store the obtained pseudo-translated string corresponding to the untranslated string. The pseudo-translation service or API may include translation APIs provided by Microsoft Corporation of Redmond, Wash., or Google LLC of Mountain View, Calif. The pseudo-translated string may be stored in temporary storage such as a cache memory or RAM, or they may be stored in permanent storage such as a hard disk drive or a solid-state drive (SSD). At step 704, it is determined whether there are any more untranslated strings, and if there are more untranslated strings (704—YES), the method may proceed to step 702, and otherwise (704—NO), the method may proceed to step 705.

At step 705, the application may set the target locale as its current locale setting. Once the locale is adjusted, any time a view is rendered within the application, the appropriate translated strings will be loaded. For example, for iOS® mobile operating system manufactured by Apple Inc. of Cupertino, Calif., the application may hook the NSLocalizedString( ) API in order to force the operating system to use the target locale's resource bundle. On the other hand, for Android® mobile operating system manufactured by Google LLC of Mountain View, Calif., the locale of the resource configuration may be updated with the target locale.

At step 706, the application may render its current view. Rendering of the view may be triggered manually or automatically and performed by a UI render service. For example, for iOS® operating system, re-rendering the current view may be triggered by restarting the lifecycle of the current "view controller" (defined by the UIViewController class of the iOS® API) of the application. For Android® operating system, re-rendering the current view may be triggered by refreshing the application's activity and/or fragment according to the Android® API. The rendering process will be further detailed below with reference to FIG. 8.

At step 707, the application may generate a screenshot of the rendered view. The screenshot may be stored for transmission to a web console.

At step 708, the application may reset its locale setting to the default locale (e.g., "en-US") such that the current view may be re-rendered back to its default locale.

FIG. 8 is a flowchart for an example method of rendering a current view. As such, one or more steps shown in FIG. 8 may be performed in lieu of step 708 of FIG. 7, but they may be performed in any other combinations with the steps of FIG. 7.

At step 801, the application may identify the next key in the appropriate localization resource (e.g., string table). If the key is translated (e.g., there exists a translated string corresponding to the key for the target locale) (802—YES), the translated string (typically translated by a human) of the key is obtained from the localization resource at step 803. If, on the other hand, the translated string is missing from the localization resource (803—NO), then the method proceeds to step 804 and a pseudo-translated string (typically machine-translated) of the key is obtained. The pseudo-translated sting may have been previously generated via a translation service and stored in the application. If there happen to exist both a human-translated string and a pseudo-translated string for a given key, then priority may be given to the human-translated string to be included in the rendered UI screen. At step 805, the application determines if there are any more keys to process, and if there is more (805—YES), then the method returns to step 801.

When there are no more keys to process (805—NO), then at step 806, the application may render the current view of the application based on the translated strings and any pseudo-translated strings obtained from the previous steps.

FIG. 9 is a flowchart for an example method of providing UI previews for multiple locales selected by a user.

At step 901, one or more locale selections may be received from a user via a web console. The locales may be selected from a plurality of locales that are available to an application (e.g., a mobile app) running on a first device (e.g., a smartphone). The web console may be accessed through a web browser running on a second device (e.g., a PC or workstation). At step 902, the web console may send indications of the locale selections to the application running on the first device. Next at step 903, the application may set one of the received target locales (e.g., selected locales) as its current locale. The current view of the application may then be rendered according to the currently set locale and a screen shot of the rendered view may be generated and stored at step 904. If there are any other target locales to process (905—YES), then the method returns to step 903 and the next target locale from the received locale selections may be set as the current locale.

After all the target locales have been processed and the corresponding screenshots are generated (905—NO), the screenshots are sent to the web console at step 906. Then, at step 907, the application may optionally set its current locale back to the default locale (or whichever locale was originally set before step 902) and render the current view according to the default locale (e.g., "en-US"). Alternatively, step 907 may be performed before step 906 or substantially concurrently with step 906. Finally, at step 908, the web console may display the received screenshots of the application's UI screens corresponding to multiple locales. The user may inspect the screenshots for any discrepancies, inconsistencies, or errors and make appropriate adjustments to the resource files, source code, etc. during the application development or updating process.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a first device and from a second device, an indication of a first locale and a second locale while an application is running on the first device and displaying a current view of the application;
   rendering, by the application and based on the indication, a plurality of user interface (UI) screens comprising:
      a first UI screen, corresponding to the current view of the application, for the first locale, and
      a second UI screen, corresponding to the current view of the application, for the second locale;
   generating, by the application, a plurality of screenshots comprising a first screenshot and a second screenshot, wherein the first screenshot corresponds to the first UI screen, and the second screenshot corresponds to the second UI screen; and
   sending, by the application, the plurality of screenshots to the second device,
   wherein the rendering the plurality of UI screens comprises:
      after determining that a translated string corresponding to a key is missing from a resource corresponding to the first locale, generating a pseudo-translated string for the key; and
      rendering the first UI screen based on the pseudo-translated string.

2. The method of claim 1, wherein the second device comprises a web console, and
   wherein the indication is received by the second device from a user via the web console.

3. The method of claim 1, further comprising:
   sending, by the first device and to the second device, a command to cause the plurality of screenshots to be displayed.

4. The method of claim 1, wherein the resource corresponding to the first locale is a string table comprising a plurality of entries, each entry of the plurality of entries comprising at least one of a key, a string identifier, or a localized string corresponding to the first locale.

5. The method of claim 1, wherein rendering the plurality of UI screens comprises:
   switching a current locale of the application from a default locale to the first locale;
   rendering the first UI screen, corresponding to the current view of the application, for the first locale;
   storing the rendered first UI screen;
   switching the current locale of the application from the first locale to the second locale;
   rendering the second UI screen, corresponding to the current view of the application, for the second locale;
   storing the rendered second UI screen; and
   switching the current locale of the application from the second locale to the default locale.

6. The method of claim 1, wherein the application comprises a web server, and
   wherein sending the plurality of screenshots comprises sending, by the web server and to the second device, a webpage comprising the plurality of screenshots.

7. The method of claim 1, wherein sending the plurality of screenshots to the second device comprises:
   generating a composite UI screen comprising the first screenshot and the second screenshot; and
   sending the composite UI screen to the second device.

8. The method of claim 1, wherein rendering the plurality of UI screens comprises rendering the plurality of UI screens without restarting the application.

9. A system comprising:
   one or more processors; and
   memory storing instructions that, when executed by the one or more processors, cause the system to:
      receive, from a device, an indication of a first locale and a second locale while an application is running and displaying a current view of the application;
      render, by the application, a plurality of user interface (UI) screens comprising:
         a first UI screen, corresponding to the current view of the application, for the first locale, and
         a second UI screen, corresponding to the current view of the application, for the second locale;
      generate, by the application, a plurality of screenshots comprising a first screenshot and a second screenshot, wherein the first screenshot corresponds to the first UI screen, and the second screenshot corresponds to the second UI screen; and
      send, by the application, the plurality of screenshots to the device,
   wherein the instructions, when executed by the one or more processors, cause the system to render the plurality of UI screens by:
      after determining that a translated string corresponding to a key is missing from a resource corresponding to the first locale, generating a pseudo-translated string for the key; and
      rendering the first UI screen based on the pseudo-translated string.

10. The system of claim 9, wherein the resource corresponding to the first locale is a string table comprising a plurality of entries, each entry of the plurality of entries comprising at least one of a key, a string identifier, or a localized string corresponding to the first locale.

11. The system of claim 9, wherein, to render the plurality of UI screens, the instructions, when executed by the one or more processors, further cause the system to:
   switch a current locale of the application from a default locale to the first locale;
   render the first UI screen, corresponding to the current view of the application, for the first locale;
   store the rendered first UI screen;
   switch the current locale of the application from the first locale to the second locale;
   render the second UI screen, corresponding to the current view of the application, for the second locale; and
   store the second UI screen;
   switch the current locale of the application from the second locale to the default locale.

12. The system of claim 9, wherein the application further comprises a web server, and
   wherein, to send the plurality of screenshots, the instructions, when executed by the one or more processors, further cause the system to send, via the web server and to the device, a webpage comprising the plurality of screenshots.

13. The system of claim 9, wherein, to send the plurality of screenshots, the instructions, when executed by the one or more processors, further cause the system to:
   generate a composite UI screen comprising the first screenshot and the second screenshot; and
   send the composite UI screen to the device.

14. A non-transitory computer-readable medium storing instructions that, when executed by a processor, cause the processor to:
   receive, by a first device and from a second device, an indication of a first locale and a second locale while an application is running on the first device and displaying a current view of the application;
   render, by the application, a plurality of user interface (UI) screens comprising:
      a first UI screen, corresponding to the current view of the application, for the first locale, and
      a second UI screen, corresponding to the current view, for the second locale;
   generate, by the application, a plurality of screenshots comprising a first screenshot and a second screenshot, wherein the first screenshot corresponds to the first UI screen, and the second screenshot corresponds to the second UI screen; and
   send, by the application, the plurality of screenshots to the second device,
   wherein, to render the plurality of UI screens, the instructions, when executed by the processor, cause the processor to:
      after determining that a translated string corresponding to a key is missing from a resource corresponding to the first locale, generate a pseudo-translated string for the key; and
      render the first UI screen based on the pseudo-translated string.

15. The non-transitory computer-readable medium of claim 14, wherein the resource corresponding to the first locale is a string table comprising a plurality of entries, each entry of the plurality of entries comprising at least one of a key, a string identifier, or a localized string corresponding to the first locale.

16. The non-transitory computer-readable medium of claim 14, wherein, to render the plurality of UI screens, the instructions, when executed by the processor, further cause the processor to:
   switch a current locale of the application from a default locale to the first locale;
   render the first UI screen, corresponding to the current view of the application, for the first locale;
   store the rendered first UI screen;
   switch the current locale of the application from the first locale to the second locale;
   render the second UI screen, corresponding to the current view of the application, for the second locale; and
   store the second UI screen;
   switch the current locale of the application from the second locale to the default locale.

17. The non-transitory computer-readable medium of claim 14, wherein the application comprises a web server, and
   wherein, to send the plurality of screenshots, the instructions, when executed by the processor, further cause the processor to send, via the web server and to the second device, a webpage comprising the plurality of screenshots.

* * * * *